United States Patent [19]
Tanaka et al.

[11] Patent Number: 5,566,922
[45] Date of Patent: Oct. 22, 1996

[54] GATE VALVE DEVICE

[75] Inventors: Yutaka Tanaka, Yokohama; Kunitaka Ozawa, Isehara; Takao Kariya, Hino; Shunichi Uzawa, Nakamachi, all of Japan

[73] Assignee: Canon Kabushiki Kaisha, Tokyo, Japan

[21] Appl. No.: 481,826

[22] Filed: Jun. 7, 1995

Related U.S. Application Data

[63] Continuation of Ser. No. 186,893, Jan. 27, 1994, abandoned, which is a continuation of Ser. No. 988,012, Dec. 9, 1992, abandoned, which is a continuation of Ser. No. 651,607, Feb. 6, 1991, abandoned.

[30] Foreign Application Priority Data

Feb. 9, 1990 [JP] Japan ................. 2-028494

[51] Int. Cl.⁶ ..................................... F16K 25/00
[52] U.S. Cl. ............................ 251/157; 251/193
[58] Field of Search ........................ 251/158, 187, 251/193, 175, 188

[56] References Cited

U.S. PATENT DOCUMENTS

| | | | |
|---|---|---|---|
| 2,666,539 | 1/1954 | Avery | 251/158 |
| 3,170,668 | 2/1965 | Anlisa | 251/187 X |
| 3,789,875 | 2/1974 | Mchee | 137/554 X |
| 4,062,515 | 12/1977 | Bobo | 251/175 X |
| 4,313,815 | 2/1982 | Graves, Jr. et al. | 204/298 |
| 4,550,742 | 11/1985 | Stearns | 251/175 X |

FOREIGN PATENT DOCUMENTS

| | | |
|---|---|---|
| 0225942 | 6/1987 | European Pat. Off. . |
| 1353573 | 1/1963 | France . |
| 1-225118 | 8/1989 | Japan . |

*Primary Examiner*—Henry A. Bennett
*Assistant Examiner*—Dinnatia Doster
*Attorney, Agent, or Firm*—Fitzpatrick, Cella, Harper & Scinto

[57] ABSTRACT

A gate valve device which includes a partition wall having an opening, a valve member movable along the partition wall to open or close the opening, a driving system for moving the valve member, and a pressing mechanism for pressing the valve member toward the partition wall. The pressing mechanism has a pressing member projectable toward and retractable from the valve member, wherein the pressing mechanism presses the valve member against the partition wall when the valve member is in a position closing the opening.

6 Claims, 7 Drawing Sheets

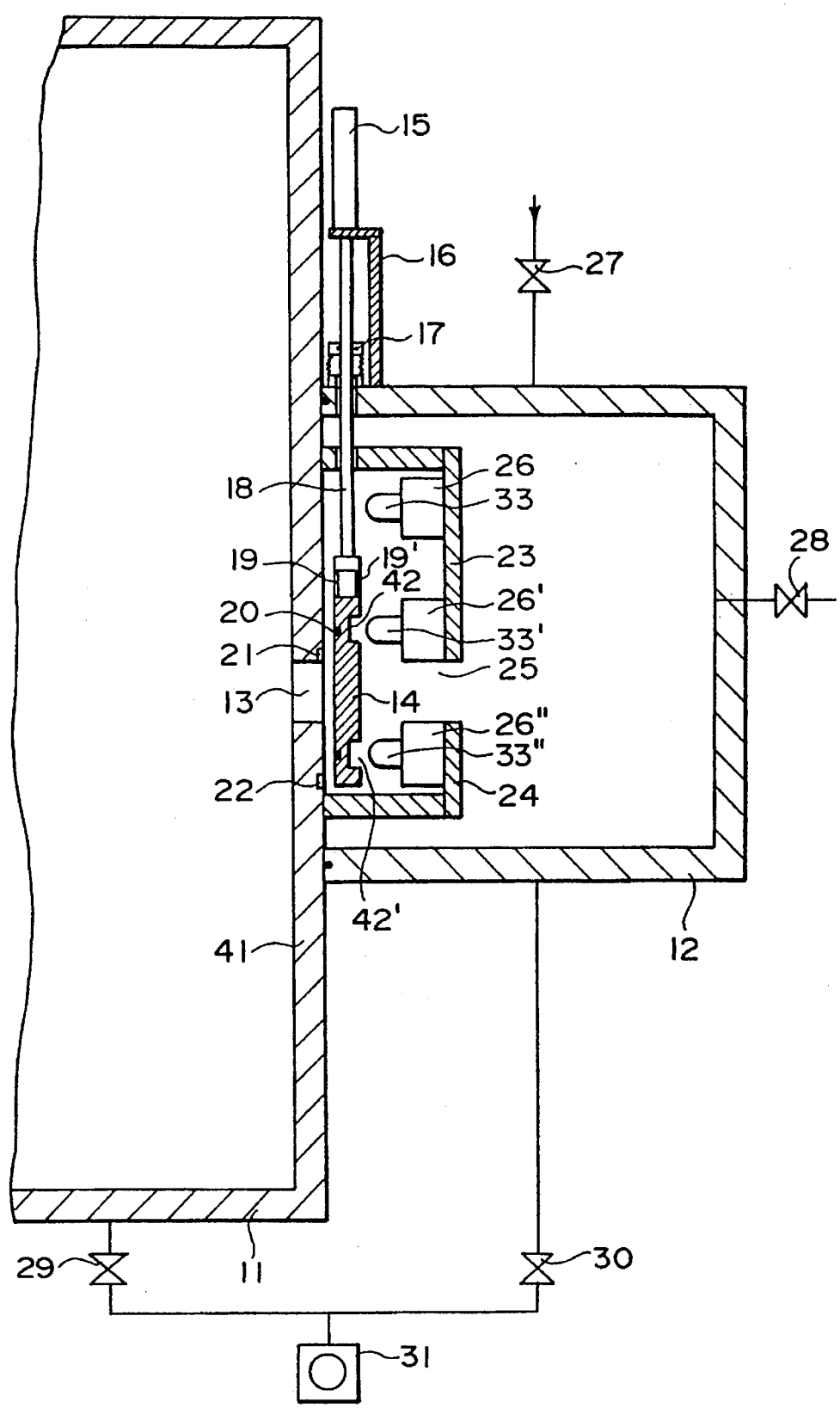
F I G. 1A

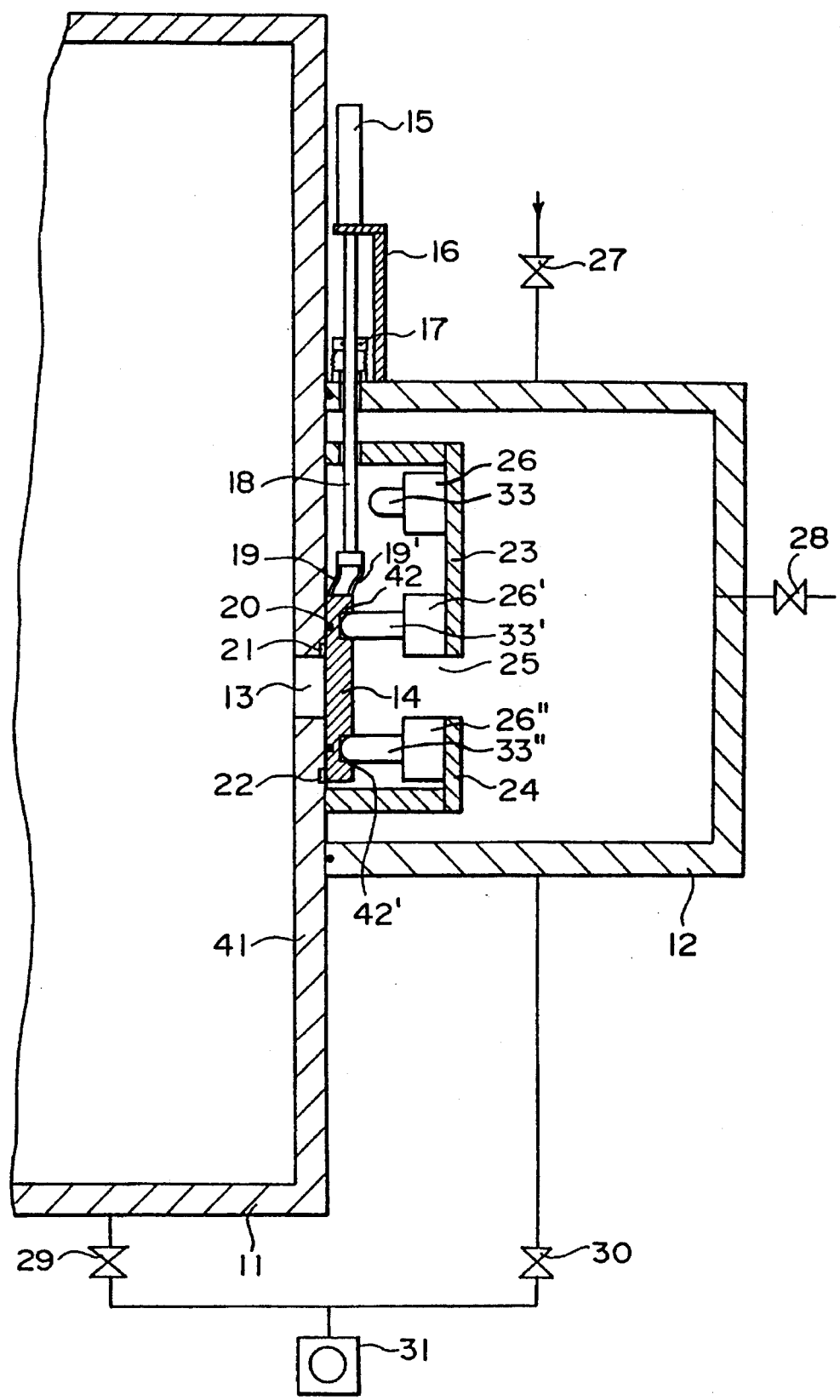
F I G. 1C

GATE VALVE DEVICE

This application is a continuation of application Ser. No. 08/186,893, filed Jan. 27, 1994, which is a continuation of application Ser. No. 07/988,012, filed Dec. 9, 1992, which is a continuation of application Ser. No. 07/651,607, filed Feb. 6, 1991, now all abandoned.

FIELD OF THE INVENTION AND RELATED ART

This invention relates to a gate valve device to be provided at an opening of a partition between two spaces and, more particularly, to a gate valve device suitably usable in a load-lock mechanism for a semiconductor device manufacturing apparatus.

It has been proposed that for suppressing a decrease in the throughput of an X-ray exposure apparatus, a stage accommodating chamber for accommodating a mask and a wafer as well as a wafer stage for effecting mask-to-wafer alignment is filled with a gaseous fluid (e.g. helium gas) of a reduced pressure, not higher than the atmospheric pressure and having a low absorptivity to the X-rays (Japanese Laid-Open Patent Application No. 225118/1989). In such arrangement, a semiconductor wafer is placed on a stage, and various processes are effected within the reduced-pressure helium ambience. Also, a load-lock mechanism is used to keep the helium processing chamber (stage accommodating chamber) for effecting these processes, filled with the reduced-pressure helium ambience even during a period of wafer replacement. The load-lock mechanism is such a mechanism that: before and/or after the processing chamber (stage accommodating chamber) for effecting the wafer processing, a vacuum sub-chamber or a load-lock chamber (wafer carrier accommodating chamber) adapted to allowing wafer loading and unloading without opening the processing chamber to the atmosphere, is mounted through the interposition of a gate valve device, such that with the control of the operation of a vacuume-vacuating system and the helium supplying operation as well as the operation of the gate valve in combination, the processing chamber is always kept filled with the reduced-pressure helium ambience.

FIG. 5 shows a known type load-lock mechanism. Wafer carrier accommodating chamber 2 is provided outside a side wall of a stage accommodating chamber 1, having an opening 3. The opening 3 is openably closed by a valve member 4 which is driven by an air-cylinder 5. In the closing motion, the valve member 4 slides while contacting a pressing ball 6, mounted on a support frame 7, so that it is urged against the side wall of the stage accommodating chamber and it tightly closes the opening 3.

SUMMARY OF THE INVENTION

However, in this type of load-lock mechanism, there are inconveniences such as that, since in the opening and closing motion the valve member 4 slides on and contacts to the pressing ball 6, dust or foreign particles are produced and the produced particles can adhere to the wafer. Also, if an accident such as electric service interruption or air-down occurs when the valve member is open, since the valve member is not fixed and is movable, there is a possibility of damage to a wafer or a hand passing through the opening 3 by the valve member.

It is accordingly a primary object of the present invention to provide a gate valve device which is free from the problem of dust production, and in which the valve member can be securely held immovable even in an accidental occasion such as service interruption or malfunction.

In accordance with an aspect of the present invention, to achieve this object the gate valve device comprises a partition wall having an opening, a valve member slidable along the partition wall to openably close the opening, driving means for the valve member, and pressing means retractably projectable toward the valve member so as to press the valve member against the partition wall. In the closed position of the valve member, the valve member can be pressed toward the partition wall. Further, spring means may be provided so as to continuously urge the pressing means in its projecting direction, by which the holding of the valve member is secured even in a case of air-down or the like.

The opening and closing motion of the valve member may be effected with the pressing means kept retracted and, at the open position and closed position of the valve member, the pressing means may be projected to press the valve member against the partition wall to fix the same. This effectively prevents damage of a wafer conveying mechanism or the like even in an accidental occasion such as service interruption of malfunction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a sectional view of a gate valve device of a load-lock mechanism in the open position according to an embodiment of the present invention.

FIG. 1C is a sectional view of the gate valve device in the closed position.

DESCRIPTION OF THE PREFERRED EMBODIMENTS

Figure 1B:
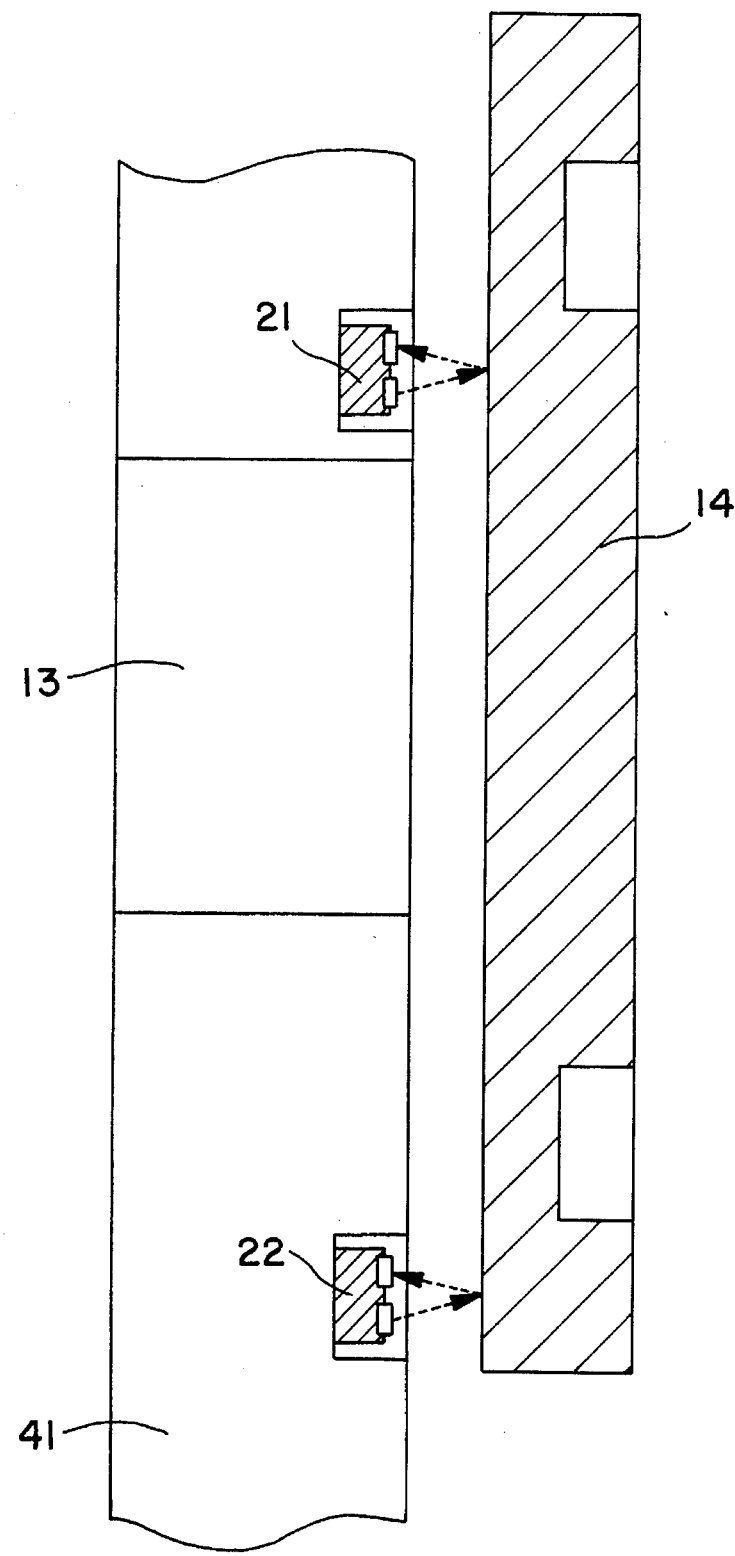
FIG. 1B is an enlarged sectional view of the gate valve device illustrating sensors and a gate valve.

FIG. 1A shows the structure of a load-lock mechanism according to an embodiment of the present invention. Stage accommodating chamber (hereinafter "processing chamber") 11 has a side wall (partition wall) 41 with an opening 13. On the outside of the side wall 41, a wafer carrier accommodating chamber (hereinafter "sub-chamber") 12 is provided. Valve member 14 is mounted in this sub-chamber 12 so as to be opposed to the opening 13 for opening/closing of the same. The valve member 14 is movable along the side wall 41 surface, without contact thereto. Sealing member 20 such as an O-ring, for example, is provided in the inside surface of the valve member. Air-cylinder 15 is mounted to the outside of the sub-chamber 12, through a support frame 16. The air-cylinder 15 has a rod 18 which extends through a bellows 17 and projects into the sub-chamber 12. The rod 18 is coupled to the valve member 14 by means of parallel leaf springs 19 and 19'. At predetermined positions on the opposite sides of the opening 13, an open-detection sensor 21 and a closure-detection sensor 22 are provided, for discrimination of an open state and a closed state of the valve member 14, respectively. These sensors 21 and 22 may comprise reflection type optical sensors, for example, adapted to detect the presence/absence of the valve member on the basis of detection of reflection light from the valve member 14. Such sensors are illustrated in FIG. 1B. Alternatively, transmission type sensors or any other suitable sensors such as magnetic sensors, for example, may of course be used.

Support frames 23 and 24 are provided in the sub-chamber 12, and pressing cylinders 26, 26' and 26" for pressing the valve member 14 toward the side wall 41 of the processing chamber 11 are mounted on these support frames. Between the support frames 23 and 24, a wafer carrier conveying passageway 25 is defined in alignment with the opening 13. The pressing cylinders 26, 26' and 26" have pressing rods 33, 33' and 33", respectively, which are projectable toward the valve member and retractable from it. The valve member 14 is formed with two recesses 42 and 42' for receiving free ends of two of the pressing rods 33-33" as they are in the projected positions.

The processing chamber 11 and the sub-chamber 12 are communicated with a vacuum pump 31 through valves 29 and 30, respectively. Also, the sub-chamber 12 is communicated with a helium supply source (not shown) through a valve 27. Further, the sub-chamber 12 is equipped with a leakage valve 28, through which the sub-chamber 12 can be opened to the atmosphere.

Figure 2:
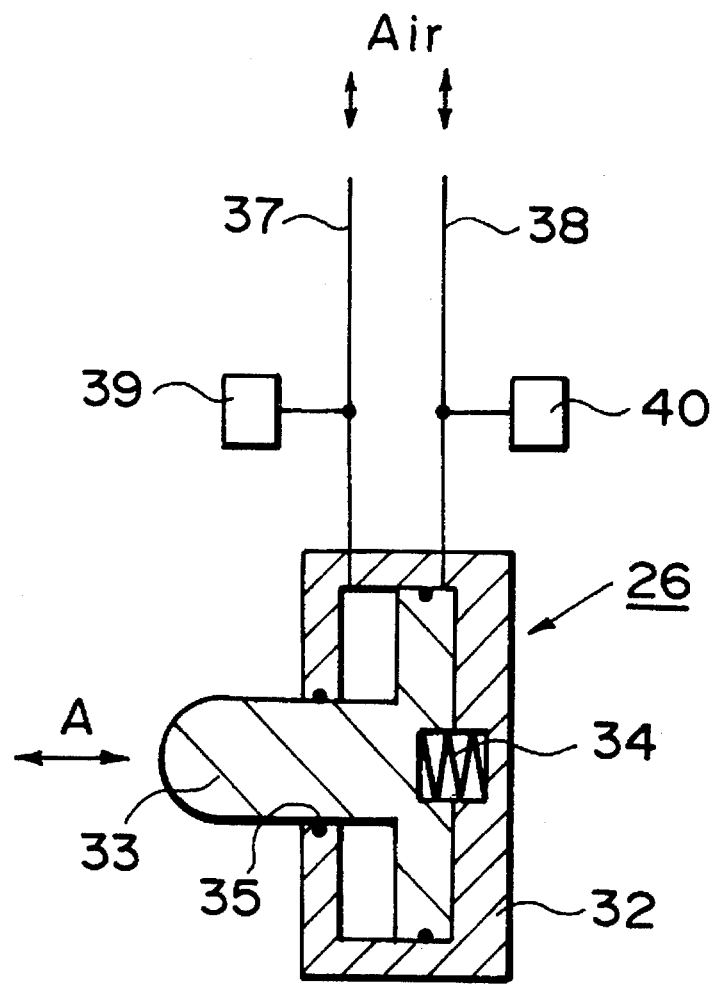
FIG. 2 is a schematic view showing details of a pressing means of the gate valve device of FIG. 1A.

FIG. 2 shows details of the pressing cylinder 26, as a representative example of the cylinders 26-26". The pressing rod 33 is mounted in a frame 32 of the cylinder for reciprocatory motion as depicted by an arrow A. Coiled spring 34 urges the pressing rod 33 toward the projected position of the rod. In order to provide gas-tightness to the cylinder frame 32, a sealing member 35 such as an O-ring is mounted in a portion thereof slidingly contacting the pressing rod 33. Bellows may be provided if necessary. Coupled to the cylinder frame 32 are a first piping means 37 and a second piping means 38 for two-position control, which are communicated with a compressed-air source (not shown). The first and second piping means 37 and 38 are equipped with pressure sensors 39 and 40, respectively.

The operation of the load-lock mechanism of the structure described above, will be explained. When pressurized air is introduced into the first piping means 37, the pressing rod 33 moves rightwardly as viewed in the drawing against the bias of the spring 34, and it is brought to the retracted position (FIG. 2 state) spaced from the side wall 41 (FIG. 1). If the pressure supply through the first piping means 37 is stopped and pressurized air is introduced into the second piping means 38, the pressing rod 33 moves leftwardly in the drawing to its protruded position. Here, a valve means (not shown) for interchangeably supplying the pressurized air to the first and second piping means is so set that the pressurized air is supplied into the second piping means 38 at the time of electric service interruption. As an example, a solenoid valve may be used and operated so that the first piping means is selected in response to the voltage application, while the second piping means is selected in response to the interruption of voltage application.

When a wafer is to be processed in the processing chamber 11, the cylinder 15 is actuated to move the valve member 14 to its closed position (FIG. 1 state), and the first piping means 37 for lower two pressing cylinders 26' and 26", as viewed in the drawing, is opened to the atmosphere while, on the other hand, the second piping means 38 is pressurized to project the pressing rods 33' and 33". By this operation, the pressing rods 33' and 33" move into the recesses 42 and 42' of the valve member 14 and press-contact the valve member 14 to the side wall 41 which serves as a partition wall. At this time, under the function of the parallel leaf springs 19 and 19', the lateral motion of the valve member 14 is made smoothly. The sealing member 20 at the inside surface of the valve member 14 serves to sealingly close the opening 13, whereby the processing chamber 11 and the sub-chamber 12 can be separated gas-tightly.

When the opening 13 is to be opened for wafer replacement, first the first piping means 37 for the pressing cylinders 26-26" is pressurized while, on the other hand, the second piping means 38 is opened to the atmosphere, whereby the pressing rods 33-33" are retracted from the valve member to their retracted positions as shown in FIG. 1A. Subsequently, the cylinder 15 is actuated to move the valve member 14 upwardly as viewed in the drawing to its open position. In this state, the first piping means 37 for upper two pressing cylinders 26 and 26', as viewed in the drawing, is opened to the atmosphere while, on the other hand, the second piping means 38 is pressurized to project the pressing rods 33 and 33'. As a result, the pressing rods 33 and 33' move into the recesses 42 and 42', whereby the valve member 14 is pressed against the side wall 41 and is held fixed. In this state, a wafer carrier (not shown) is conveyed through the opening 13 into the sub-chamber 12, by means of a wafer hand (not shown).

Next, the sequential operation of wafer carrier replacement by using the load-lock mechanism with the structure and function described above, will be explained. First, the first piping means 37 for the pressing cylinders 26-26" are pressurized while the second piping means 38 for them are opened to the atmosphere, whereby the rods 33-33' are brought to their retracted positions. This state is discriminated by using the pressure sensors 39 and 40 of each piping means. Subsequently, the cylinder 15 is actuated to move the valve member 14 to its closed position. This state is discriminated by using the closure-detection sensor 22. After this, the first piping means 37 are opened to the atmosphere while the second piping means 38 are pressurized, so that the pressing rods 33-33" are brought to their projected positions. By this, the valve member 14 is pressed and fixed in the closed state. FIG. 1C shows the valve member 14 in this closed position. While gas-tightly closing the opening 13 in this manner, the valve 30 is closed and the leakage valve 28 is opened to open the sub-chamber 12 to the atmosphere. In this state, the wafer carrier within the sub-chamber 12 is replaced by another. Subsequently, the leakage valve 28 is closed and the valve 30 communicated with the vacuum pump is opened. It is to be noted here that the wafer carrier replacement may be effected after the leakage valve 28 is closed. Subsequently, by using the vacuum pump 31, the sub-chamber 12 is vacuum-evacuated to a predetermined pressure (e.g., $10^{-3}$ Torr), and the valve 30 is closed. Then, the valve 27 is opened to introduce a helium gas into the sub-chamber 12, until a predetermined pressure (e.g. 150 Torr) is established in the sub-chamber 12. After the predetermined pressure is reached, the valve 27 is closed. In this state, the pressing cylinders 26-26" are actuated to move the pressing rods 33-33" to their retracted positions. This state is discriminated by using the pressure sensors 39 and 40 provided in the piping means 37 and 38 of the pressing cylinders 26-26". If the disengagement of the pressing rods 33-33" from the valve member 14 is discriminated, the cylinder 15 is actuated to move the valve member 14 to its open position. This state is discriminated by using the open-detection sensor 21. If the open position of the valve member 14 is discriminated, the pressing cylinders 26-26" are actuated to project the pressing rods 33-33", whereby the valve member 14 is pressed and held against the side wall 41. This state is discriminated by using the pressure sensors 39 and 40. In this state, by using a conveying system (not shown), the wafer is taken out of the carrier. In this manner, the wafer carrier replacement is completed.

As described hereinbefore, the pressing means for the valve member is structured to be projectable toward the valve member and retractable from it and, additionally, the pressing means is kept out of sliding contact with the valve member during the opening and closing motion of the valve member. With this arrangement, production of dust or foreign particles is prevented and, therefore, it is possible to obtain high-quality semiconductor wafers. Further, not only at the closed position of the valve member but also at the open position thereof, the valve member is pressed and held fixed against the wall surface. For this reason, the open state can be securely held. Thus, even in an accidental occasion such as electric service interruption or malfunction, there is no possibility of damaging a conveying means moving through the opening by the displaced valve member. Further, the projected portion of the pressing means moves into a recess formed in the valve member to press and hold the valve member. Therefore, the holding and fixing operation of the valve member is made securely. Additionally, the provision of a spring means which constantly urges the pressing means in its projecting direction is effective to enhance the security of the holding and fixing operation to the valve member.

Figure 3:
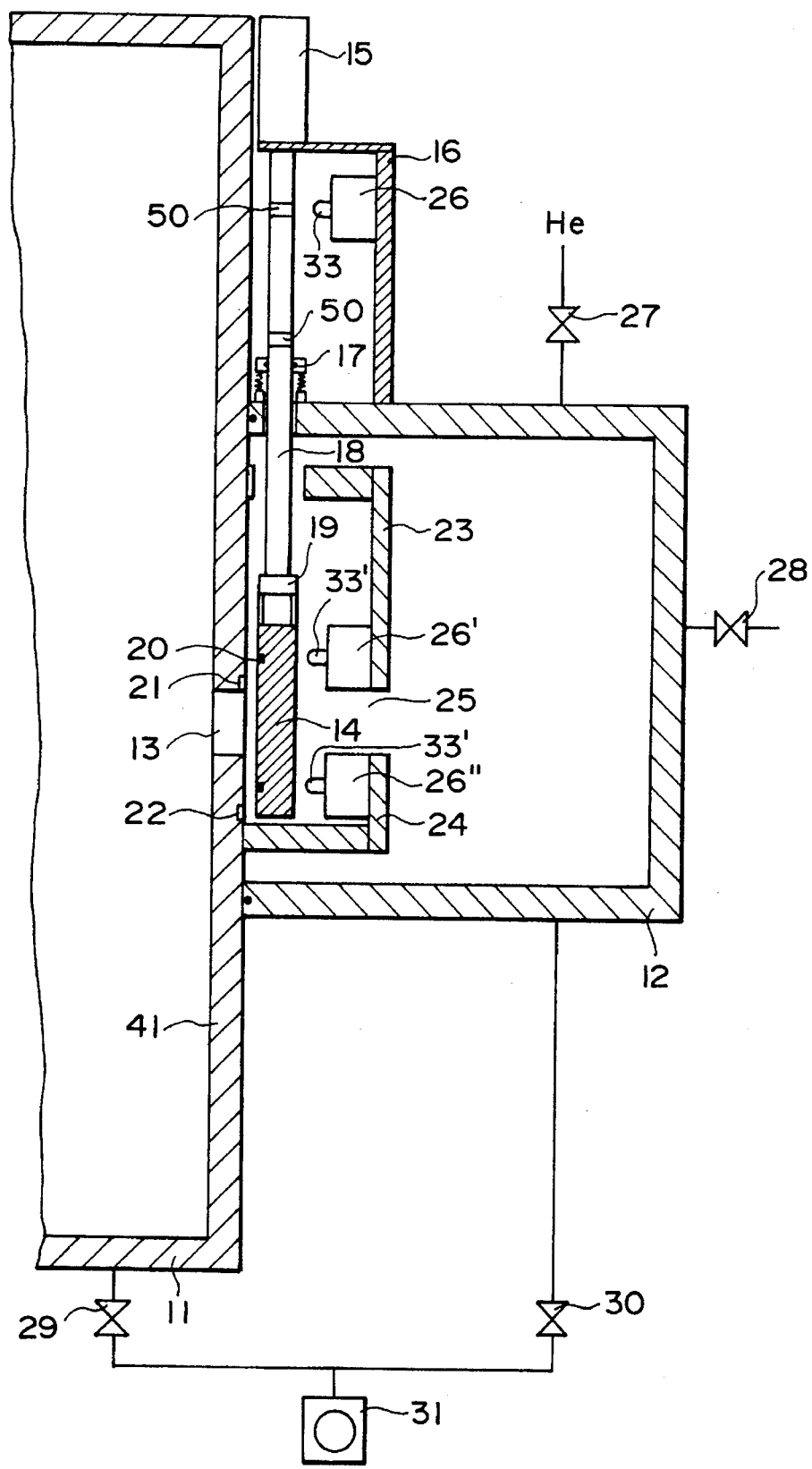
FIG. 3 is a sectional view of a gate valve device according to another embodiment of the present invention.

FIG. 3 shows another embodiment of the present invention. In this embodiment, support frames 23 and 24 are provided in a sub-chamber 12 and, to these support frames, pressing cylinders 26' and 26"are mounted. The pressing cylinders 26' and 26" serve to press a valve member 14 against a side wall 41 only when the valve member is at its closed position. As compared with the FIG. 1A embodiment, the valve member 14 is not formed with any recess for receiving a free end of a rod 33' or 33".

Support frame 16 is mounted outside the sub-chamber 12 and, to this support frame 16, a pressing cylinder 26 is mounted. Rod 18 serves to couple the valve member 14 with an air cylinder 15, and the rod 18 is formed with throughbores 50 and 50'. The pressing cylinder 26 has a pressing rod 33 which can project into the throughbore 50 or 50' of the rod 18 when the valve member 14 is at its closed position or open position. The remaining portion has substantially the same structure as the FIG. 1 embodiment.

The opening and closing operation for the valve member 14 is essentially the same as that of the FIG. 1A embodiment. However, as compared with the FIG. 1A embodiment, the function for preventing unwanted displacement of the valve member 14 in an accidental occasion is provided by the cooperation of the throughbores 50 and 50' and the pressing cylinder 26 provided outside the sub-chamber 12.

Figure 4:
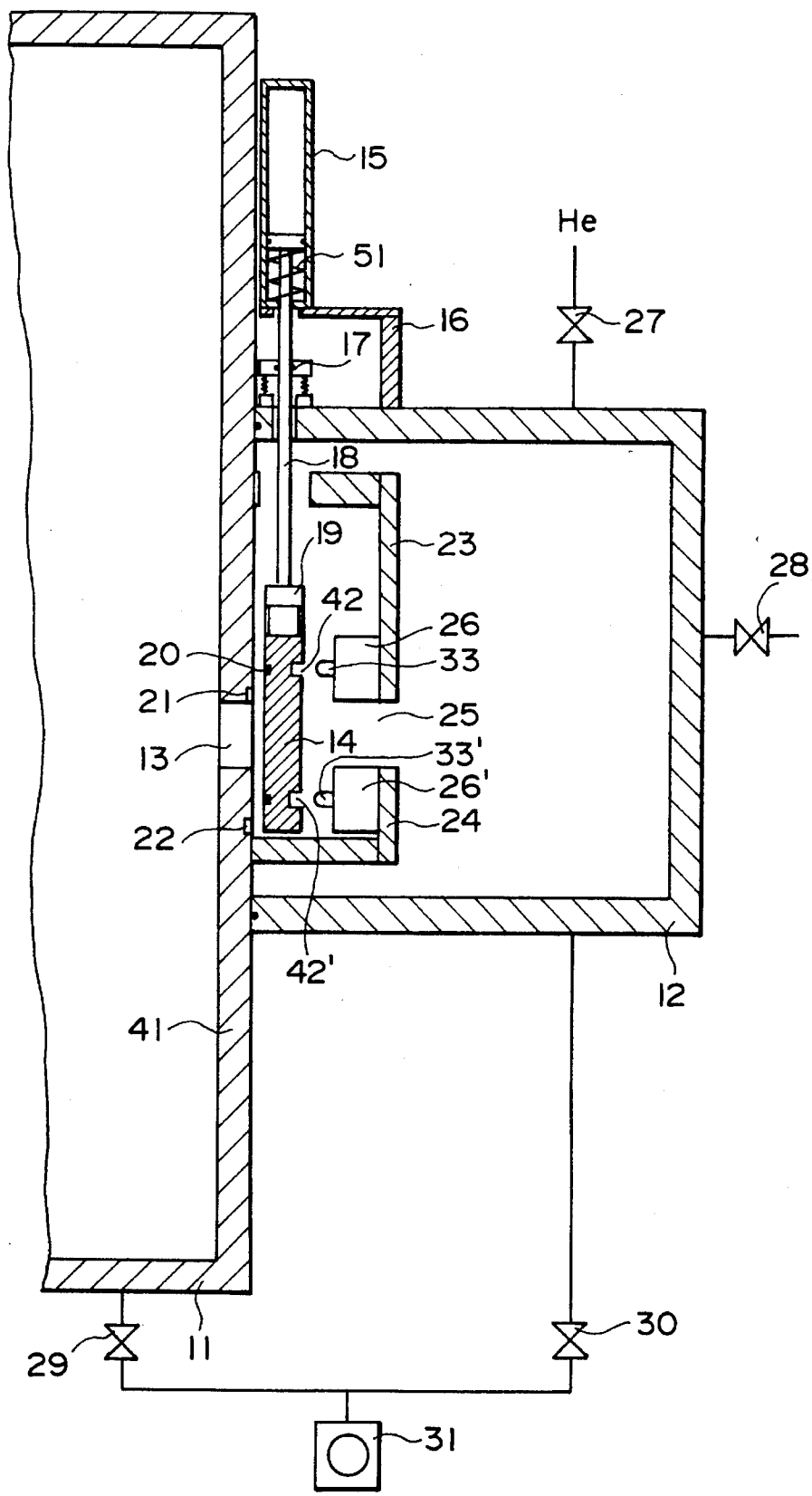
FIG. 4 is a sectional view of a gate valve device according to a further embodiment of the present invention.
Figure 5:
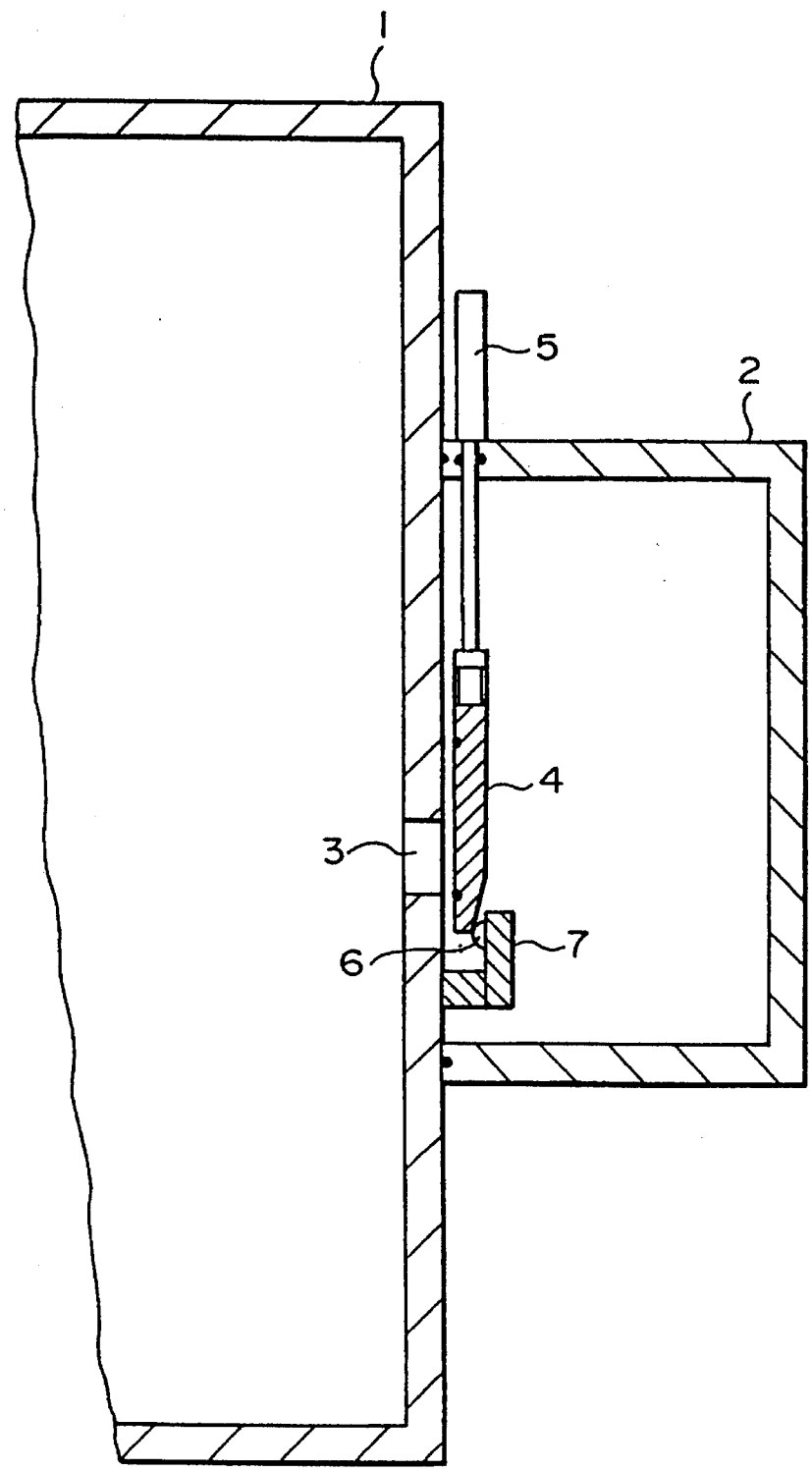
FIG. 5 is a sectional view of a known type gate valve device.

FIG. 4 shows a further embodiment of the present invention. In this embodiment, pressing cylinders 26 and 26' are mounted on support frames 23 and 24 disposed in a sub-chamber 12. The pressing cylinders 26 and 26' serve to press a valve member 14 against a side wall 41 only when the valve member 14 is at its closed position. The valve member 14 is formed with recesses 42 and 42' for receiving free ends of rods 33 and 33' of the pressing cylinders 26 and 26' as they are projected.

Coiled spring 51 is provided within an air-cylinder 15 and, by means of this coiled spring, the valve member 14 can be held at its open position even if no air is available. The remaining portion of this embodiment has substantially the same structure as of the FIG. 1A embodiment.

The closing operation for the valve member 14 is essentially the same as that of the FIG. 1A embodiment. When the valve member 14 is opened, as compared with the FIG. 1A embodiment, there is no necessity of pressing the valve member 14 by the pressing cylinder. This is because in this embodiment, even if the air in the air-cylinder 15 is leaking, with the function of the spring 51 the valve member 14 is prevented from moving toward the closed position.

While the invention has been described with reference to the structures disclosed herein, it is not confined to the details set forth and this application is intended to cover such modifications or changes as may come within the purposes of the improvements or the scope of the following claims.

What is claimed is:

1. A gate valve device, comprising:

a reduced-pressure chamber having a partition wall with an opening;

a valve member for opening and closing the opening;

pressing means for pressing said valve member against said partition wall;

a first actuator, coupled to said valve member by an elastic member and supporting said valve member;

supporting means for supporting said first actuator away from said partition wall, said supporting means supporting said first actuator such that a clearance is defined between said valve member and said partition wall when said elastic member is in an undeformed state, said first actuator moving said valve member in a plane parallel to said partition wall and wherein said valve member is moved between an open position and a closing position through driving of said first actuator while maintaining said clearance; and a second actuator for projecting said pressing means toward said valve member to close the opening and for retracting said pressing means away from said valve member to a position out of contact therewith, wherein said elastic member is deformed in response to the pressing of said valve member against said partition wall as said pressing means is projected by said second actuator, wherein said pressing means includes a first pressing element for pressing said valve member against said partition wall when said valve member is in the open position, and a second pressing element for pressing said valve member against said partition wall when said valve member is in the closing position.

2. A device according to claim 1, wherein said valve member has a recess for receiving said pressing elements.

3. A device according to claim 1, further comprising a sensor for discriminating whether said valve member is in the open position or the closing position.

4. A device according to claim 3, wherein said sensor includes a first sensing element for discriminating whether said valve member is in the open position, and a second sensing element for discriminating whether said valve member is in the closing position.

5. A device according to claim 1, further comprising a sub-chamber which is in communication with said reduced-pressure chamber through the opening of said partition wall.

6. A device according to claim 1, wherein said reduced-pressure chamber serves as a chamber in which a wafer is to be processed.

* * * * *

UNITED STATES PATENT AND TRADEMARK OFFICE
CERTIFICATE OF CORRECTION

PATENT NO. :    5,566,922
DATED      :    October 22, 1996
INVENTOR(S) :   Tanaka et al.

It is certified that error appears in the above-indentified patent and that said Letters Patent is hereby corrected as shown below:

On the title page, item
[56] REFERENCES CITED:

U.S. PATENT DOCUMENTS, "Anlisa" should read --Aulisa-- and "Mchee" should read --McGee--.

Signed and Sealed this

First Day of April, 1997

*Attest:*

BRUCE LEHMAN

*Attesting Officer*   *Commissioner of Patents and Trademarks*